United States Patent
Koehn

(10) Patent No.: US 6,473,364 B1
(45) Date of Patent: Oct. 29, 2002

(54) HIGH FREQUENCY ACOUSTIC FLOAT FOR THE VERSATILE MINE SYSTEM

(75) Inventor: Brian M. Koehn, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/041,979

(22) Filed: Jan. 9, 2002

(51) Int. Cl.[7] .................... H04K 3/00; H04B 11/00
(52) U.S. Cl. ............... 367/130; 367/129; 367/131; 367/1
(58) Field of Search .................. 367/129, 130, 367/131, 135, 910, 1; 434/6, 10

(56) References Cited

U.S. PATENT DOCUMENTS

| | | | | |
|---|---|---|---|---|
| 4,009,523 A | * | 3/1977 | Van Hook | 434/10 |
| 4,017,822 A | * | 4/1977 | Rusch | 367/126 |
| 4,078,222 A | * | 3/1978 | Woodruff | 367/125 |
| 4,083,031 A | * | 4/1978 | Pharo, Jr. | 367/129 |
| 4,141,295 A | * | 2/1979 | Campbell et al. | 102/334 |
| 4,310,904 A | * | 1/1982 | Ballard et al. | 367/126 |

* cited by examiner

Primary Examiner—Ian J. Lobo
(74) Attorney, Agent, or Firm—Harvey A. Gilbert; Donald G. Peck

(57) ABSTRACT

The high frequency response of a versatile exercise mine system that emulates potentially threatening mines is extended by an acoustic float system. A watertight housing is buoyed upward from the mine system and has a first acoustic sensor to provide an omni-directional response to higher frequency acoustic signals in the range of 20 to 40 kHz that are transmitted from distant sources through ambient water. A second acoustic sensor adjacent to the first acoustic sensor produces a directional response to the higher frequency acoustic signals. Processing circuits receive signals from the acoustic sensors and generate signals representative of the higher frequency omni-directional and directional responses. An inclinometer generates signals representative of inclination of the acoustic system and a cable feeds the all the representative signals to a versatile exercise mine system for additional processing and/or evaluation.

20 Claims, 3 Drawing Sheets

HIGH FREQUENCY ACOUSTIC FLOAT FOR THE VERSATILE MINE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system to emulate underwater mines. More particularly, the system of this invention provides high frequency acoustic responses to more thoroughly emulate acoustic sensor capabilities of some underwater mines.

Ships and other marine craft that ply the waterways radiate acoustic signals that are characteristic of their design, speed, on board machinery, etc. A specific composition of the acoustic signals is relied on in some mines to selectively initiate detonation when such signals are detected within a predetermined proximity. It is, therefore, of interest to be able to determine if such compositions of acoustic signals are being emitted in sufficient strength to trigger some mines.

A contemporary system for detecting, analyzing, and providing information regarding the compositions of such acoustic signals is limited in bandwidth. Consequently, it is not capable of emulating high frequency acoustic mines since its hardware is limited to 10 kHz and is not capable of receiving acoustic signals between 20 to 40 kHz. In addition, unlike some threat mines, it is also not capable of comparing acoustic signals from an omni-directional sensor and a directional sensor in this frequency range. These limitations have greatly reduced its ability to emulate mines that are responsive to higher frequencies.

Thus, in accordance with this inventive concept, a need has been recognized in the state of the art for an effective means to extend the acoustic frequency response of an underwater system that senses remotely originating acoustic signals, collects acoustic data, and emulates mines.

OBJECTS AND SUMMARY OF THE INVENTION

An object of the invention is to provide an acoustic float system to extend the frequency response of an exercise mine system.

Another object is to provide an acoustic system extending acoustic frequency response to permit emulation of mines having extended frequency responses.

Another object is to provide an acoustic system for an exercise mine system creating a mine-fire capability that is a function of omni-directional and directional sensor outputs.

Another object is to provide an acoustic system having an inclinometer for measuring tilt attributed to ambient currents to aid in mine fire analyses.

Another object is to provide an acoustic system to extend the range of frequency response and account for inclination attributed to currents.

Another object is to provide an acoustic system being readily capable of being modified to emulate omni-directional and directional acoustic responses of different mines.

These and other objects of the invention will become more readily apparent from the ensuing specification when taken in conjunction with the appended claims.

Accordingly, the invention extends the high-frequency response of a mine emulation system. A watertight housing has a first acoustic sensor extending through a cover portion to provide an omni-directional response to higher frequency acoustic signals impinging through ambient water. A second acoustic sensor extends through the cover portion of the housing adjacent to the first acoustic sensor. The second acoustic sensor provides a directional response to the higher frequency acoustic signals. Processing circuits in the housing receive signals from the first and second acoustic sensors and generate signals representative of the higher frequency omni-directional response and the directional response. A cable extends to a mine emulation system to feed the representative signals thereto for additional processing of the higher frequency responses.

DESCRIPTION OF THE PREFERRED EMBODIMENT

Figure 1:
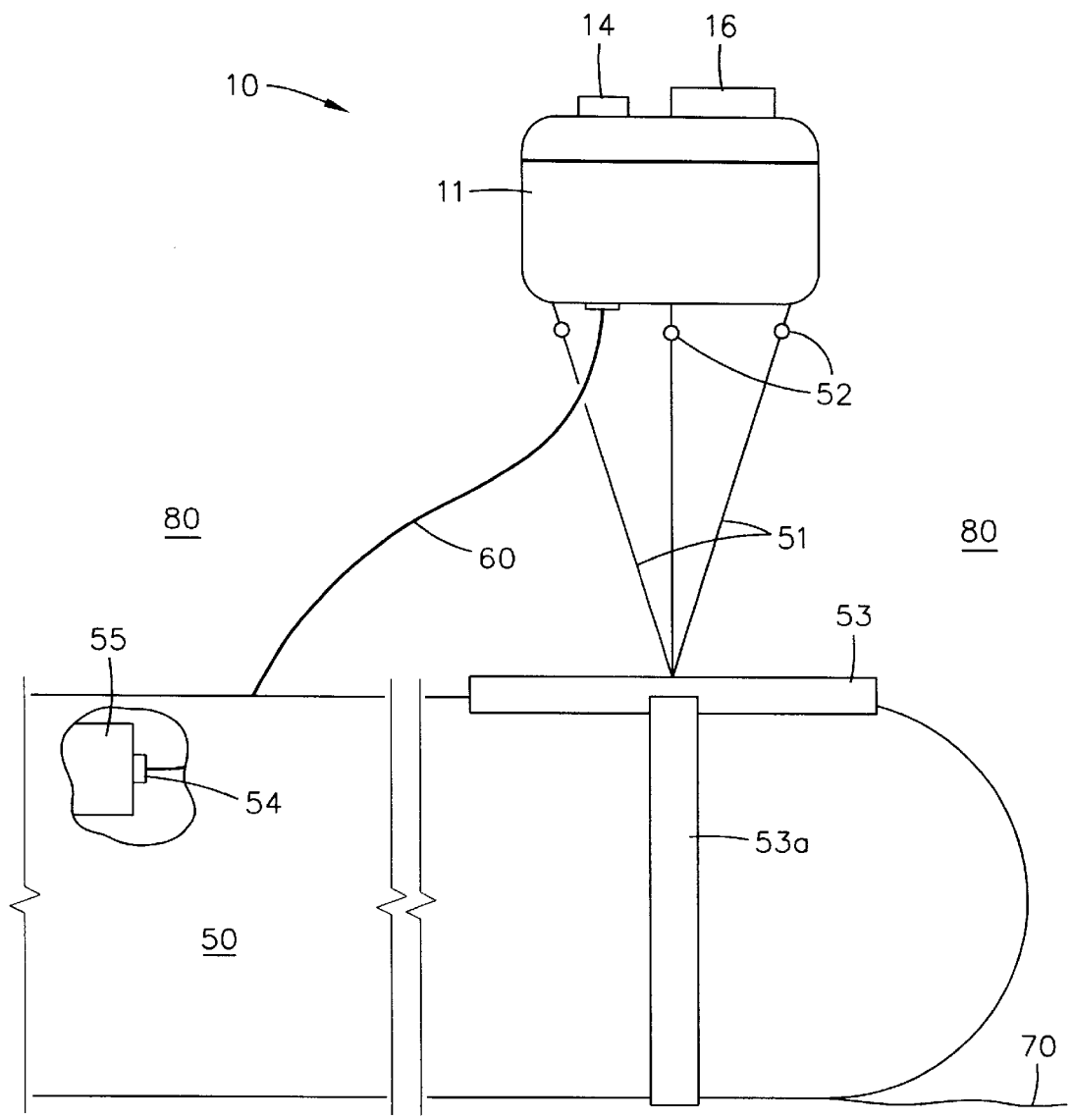
FIG. 1 is a schematic representation of the acoustic float system of the invention shown partially in cross section as it is buoyed upward from a versatile mine system (VEMS) to extend the response to acoustic signals at higher frequencies.
Figure 2:
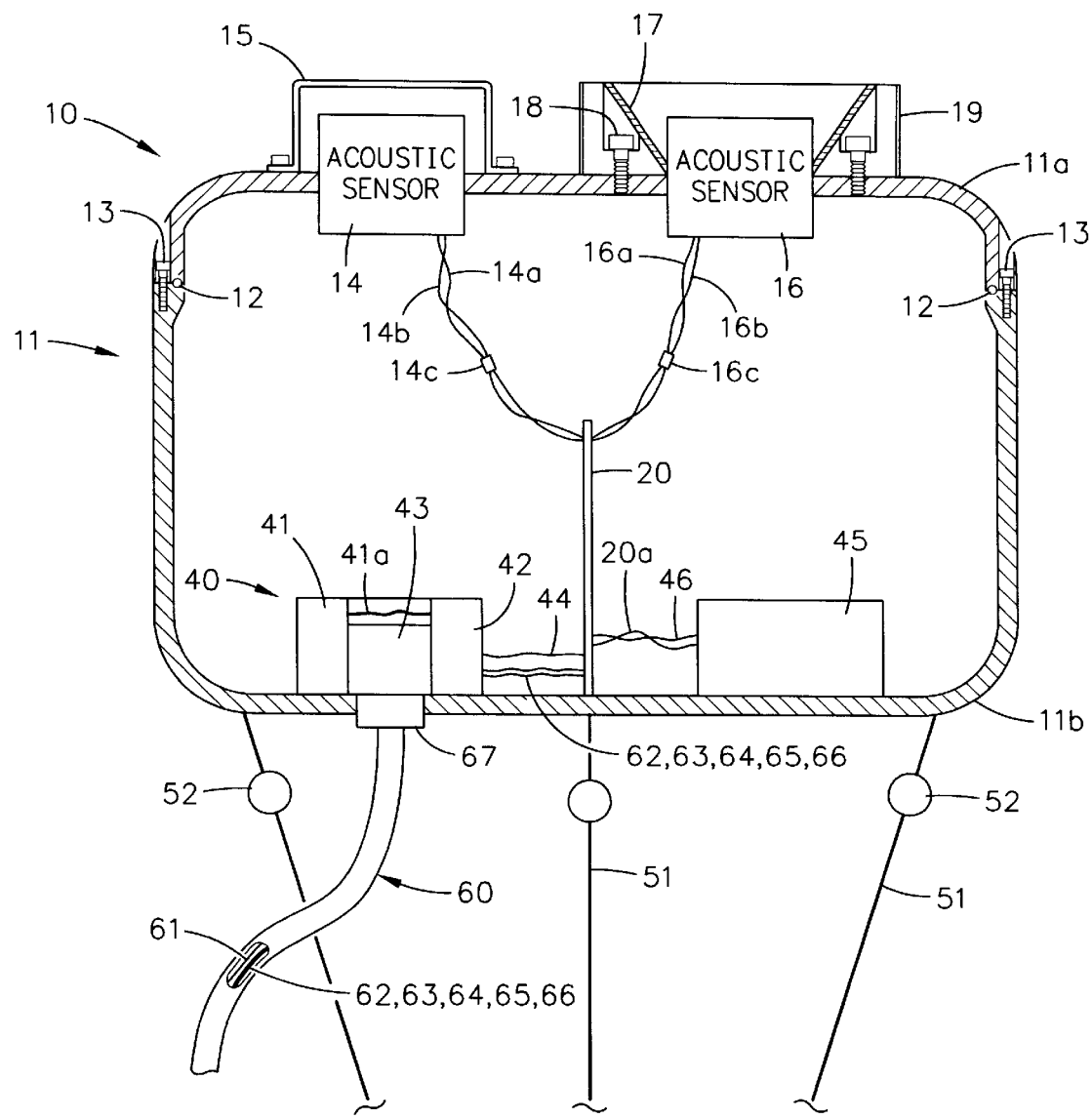
FIG. 2 is a schematic representation of the float housing and components of the invention being buoyed upward in ambient water away from the VEMS.

Referring to FIGS. 1 and 2, acoustic float system 10 of the invention is connected a versatile exercise mine system (VEMS) 50 via a cable 60. VEMS 50 is shown on the bottom, or floor 70 of a body of water 80 after it has been dropped or otherwise deployed from a surface or aircraft. Acoustic system 10 of this invention is buoyed upward in water 80 and tethered with a number of lines 51 that were reeled into and secured in VEMS 50 during transit to this location on bottom 70. Lines 51 can have quick disconnect couplers 52 to permit quick coupling and decoupling of VEMS 50 and acoustic system 10 as needed.

VEMS 50 can be an exercise mine, for example the cylindrically-shaped MARK 74 VEMS of the U.S. Navy, to provide, among other things, data regarding acoustic signals from distant sources. Such information might be useful to determine the composition of radiated signals from various craft and/or to be used in evaluation of fleet exercises to emulate the threat posed by some underwater mines. However, the highest frequency of response is limited to about 10 kHz. VEMS 50 is deployed in the ocean and rests on ocean floor 70 where it will power-up and collect acoustic/seismic, magnetic, and pressure data and emulate various real mines. By emulating the mines, VEMS 50 can retrieve data from its sensors and, via software, analyze the data to determine if the mine VEMS 50 is emulating would have been actuated from the signals received.

Acoustic system 10 of the invention has a housing 11 made from cover and base portions 11a and 11b that are held together by a plurality of tightened threaded bolts 13 that compress an O-ring 12. The mating cover and base portions 11a and 11b and compressed O-ring 12 seal the interior of housing 11 from ambient water 80 and provide the right amount of buoyancy to overcome the weight of constituents of acoustic system 10 to be described and buoy them upward and away from VEMS 50. Housing 11 can be held on rubber saddle structure 53 by tightening lines 51 or other suitable coupling means during deployment or planting of VEMS 50. Saddle structure 53 is connected to VEMS 50 by strap 53a that is wrapped and secured around VEMS 50. When 50 VEMS 50 comes to rest on bottom 70 and lines 51 are released, the positive buoyancy of acoustic system 10 buoys it upward and away from VEMS 50. Acoustic system 10 can begin to gather acoustic data at higher frequencies of about 20 to 40 kHz for VEMS 50 to immediately add to the data gathering and emulation capabilities of VEMS 50.

Acoustic data is gathered by acoustic system 10 from a cylindrical-shaped acoustic sensor 14 that gives an omni-directional response and a cylindrical-shaped acoustic sensor 16 having an anechoic cone 17 to give a directional response. Acoustic sensors 14 and 16 can be any of many proven transducers of acoustic energy that are made from known transducer building materials. These materials art fabricated according to manufacturing techniques well known in the art to provide responsive, or representative signals for acoustic, or pressure waves between 20 to 40 kHz that are transmitted through water 80 to impinge on acoustic system 10 and VEMS 50. A rigid cage, or frame 15 extends around and beyond acoustic sensor 14 for protection from damage during handling and deployment, and rigid mounting structure 18, e. g. bolts, and a rigid, thin-walled tubular shroud 19 along with anechoic cone 17 provides for protection for acoustic sensor 16.

Location of acoustic sensors 14 and 16 on cover portion 11a gives the acoustic system 10 the capability to mimic different threat mine sensors or spacings of the sensors. All that needs to be done to emulate different mines is to merely undo bolts 13, remove one cover portion 11a with its acoustic sensors 14 and 16, and substitute another cover portion 11a that has different acoustic sensors 14 and 16 with different operational parameters. Another feature of the invention for changing response is that one directional anechoic cone 17 of acoustic sensor 16 can be readily interchangeable with another. A different anechoic cone 17 to mimic different mines can be used by merely undoing bolts 18, substituting another anechoic cone 17, and retightening bolts 18.

Acoustic sensors 14 and 16 extend through cover portion 11a of housing 11 and are connected to conductors 14a and 14b and 16a and 16b. Conductors 14a and 16a couple gathered high frequency acoustic signals to a circuit board 20 mounted on base portion 11b of housing 11 for processing. Electrical power for sensors 14 and 16 is coupled over power conductors 14b and 16b from circuit board 20. Quick release couplings 14c and 16c for conductors 14a, 14b and 16a, 16b respectively can be included to enable quick substitution or replacement of different acoustic sensors as mentioned above.

Electrical power supply 40 is mounted on base portion 11b of housing 11, and provides power for acoustic system 10. Power supply 40 feeds power to circuit board 20 and acoustic sensors 14 and 16 to enable acoustic system 10 to independently gather and process high frequency acoustic signals in the range of 20 to 40 kHz. Power supply 40 can include batteries 41 connected via conductors 41a to voltage regulators 42 that connect power at the proper magnitude to circuit board 20 over conductor 44. Optionally, power converter 43 may be included in power supply to also couple power to circuit board 20 via power conductor 44. Power converter circuitry 43 is connected to suitable power conductors 61 extending in cable 60 to bulkhead connector 54 in VEMS 50 to convert the on-board power in VEMS 50 and couple it via power conductor 44. Power converter circuitry 43 thereby assures that a sufficient long-term supply of power is maintained for acoustic system 10 since a long-term supply may be needed when, for example, the period of usefulness of acoustic system 10 may exceed the power capabilities of batteries 41. Sealed packing, or fitting 67 for cable 60 extends through base portion 11b to maintain the watertight integrity of housing 11.

Figure 3:
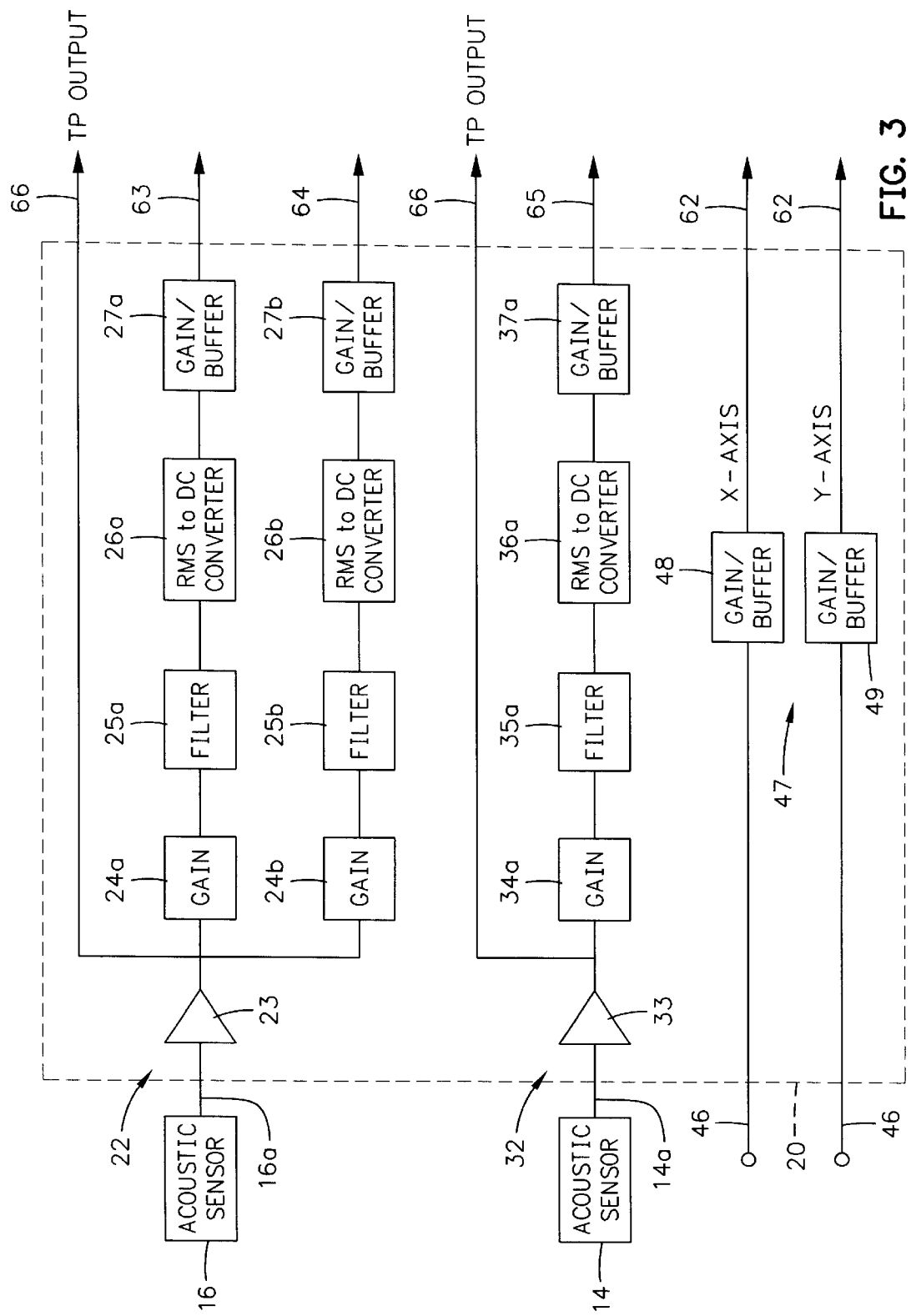
FIG. 3 is a schematic representation of circuitry on a circuit board in the watertight housing for processing acoustic signals at higher frequencies according to this invention.

Housing 11 also contains an inclinometer 45 on base portion 11b that is connected to power supply 40 via leads 20a from circuit board 20. Inclinometer 45 measures the orientation, including a possible tilt of acoustic system 10 that may be due to ambient currents in water 80. Next, inclinometer 45 produces data signals representative of tilted orientations of acoustic system 10 over conductors 46 to circuit board 20. Referring additionally to FIG. 3, an inclinometer circuit 47 in circuit board 20 receives the responsive data signals from inclinometer 45 on conductors 46, amplifies them in gain/buffer circuits 48 and 49 and feeds the amplified responsive data signals that are characteristic of X and Y-axis deflections onto data-carrying conductors 62 of cable 60. Conductors 62 pass through bulkhead connector 54 in VEMS 50 to feed the responsive data signals for processing in suitable processing modules 55 in VEMS 50. Data signals from inclinometer 45 can be used to aid in the analysis of the response of VEMS 50 to acoustic signals impinging on acoustic system 10 through ambient water 80, AKA a mine fire analysis from an emulated mine.

The mass of power supply 40 and inclinometer 45 ballast housing 11 and orient acoustic sensors 14 and 16 of acoustic system 10 to face upwardly, or vertically on cover portion 11a of housing 11. Due to the arrangements and relative weights of constituents of acoustic system 10, this vertical relationship will be maintained throughout the period of an exercise while acoustic signals are being gathered.

Circuit board 20 is mounted on base portion 11b of housing 11 and has first and second processing circuitry 22 and 32 to process the higher frequency acoustic signals received from acoustic sensors 16 and 14. Input buffers 23 and 33 receive the higher frequency acoustic signals of 20 to 40 kHz from sensors 16 and 14 and increase, or amplify their signal strengths in gain amplifiers 24a, 24b and 34a. The amplified signals are passed through narrow band-pass filters 25a, 25b and 35a to replicate (as RMS signals) the higher frequency response of the sensors of the mine being emulated (probably a foreign mine). The RMS signals from filters 25a, 25b and 35a are representative of acoustic signals in the higher frequencies of between 20 to 40 kHz and are converted in RMS-to-DC converters 26a, 26b, and 36a to DC voltage levels. These DC voltage levels are fed to gain/buffer circuits 27a, 27b and 37a. Gain/buffer circuits 27a, 27b and 37a buffer out the acoustic signals representative of higher frequencies to conductors 63, 64, and 65 for carrying data in cable 60 and connect them through bulkhead connector 54 to processing modules 55 in VEMS 50. Unprocessed TP output signals from first and second processing circuits 22 and 32 are unprocessed beyond buffering in buffer circuits 23 and 33 and may be connected to processing circuitry 55 in VEMS 50 over conductors 66 to aid in processing for some applications.

Interfacing the data generated from circuitry 22 and 32 that is representative of acoustic signals of 20 to 40 kHz from acoustic system 10 to VEMS 50 does not require any elaborate changes to VEMS 50. This data is coupled to the processing hardware in VEMS 50 by connecting data carrying conductors 62, 63, 64, and 65 to an electronic backplane 54 in VEMS 50. Typically, the data signals may be coupled to spare channels in other circuits associated with electronic backplane 54, such as those in the analog 2 and power sequencer board of the exemplary MARK 74 VEMS.

Acoustic system 10 of the invention provides a capability of making VEMS 50 responsive to emulate acoustic mines responsive to acoustic signals of higher frequencies at 20 to 40 kHz. Acoustic system 10 of the invention provides a capability of making VEMS 50 produce a mine fire based on an electronic comparison of the virtually simultaneous acoustic outputs from directional sensor 16 and omni-directional sensor 14 to allow for a software controlled mine fire in VEMS 50. This controlled mine fire can be adjusted to emulate more than one different mine, and allows for the collection of acoustic signal levels received by VEMS 50 with acoustic system 10 for later tactical analysis. Since acoustic system 10 has inclinometer 45 the influences attributed to the effect of tilt of acoustic system 10t due to water currents can be factored-in to aid in a subsequent mine fire analysis. Acoustic system 10 can be expanded to account for new mine types by substituting electronics board 20 if necessary without affecting any other hardware.

Having the teachings of this invention in mind, different applications, modifications and alternate embodiments of this invention may be adapted. Acoustic system 10 can be made in larger or smaller sizes and in a multitude of different shapes, and housing 11 could be made from a wide variety of materials. Acoustic system 10 can have different electronic circuitry to respond to still higher or different compositions of acoustic signals to emulate other sensor systems, as desired. Acoustic sensor 10 can be packaged in a case filled with a relatively non-compressible buoyant material instead of air to give a deeper submergence capability. Other modifications could be made as will be apparent to one skilled in the art to which this invention pertains.

The disclosed components and their arrangements as disclosed herein all contribute to the novel features of this invention. Acoustic system 10 of this invention is a portable, cost-effective tool that can be readily connected or disconnected to enable its addition or removal from VEMS 50 without undue effort. Therefore, acoustic system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An apparatus to extend the high frequency response of a mine emulation system comprising:
    a watertight buoyant housing having cover and base portions, said housing being buoyed away from a mine evaluation system;
    a first acoustic sensor extending through said cover portion of said housing to provide an omni-directional response to higher frequency acoustic signals impinging through ambient water;
    a second acoustic sensor extending through said cover portion of said housing and adjacent to said first acoustic sensor, said second acoustic sensor to provide a directional response to said higher frequency acoustic signals impinging through said water;
    processing circuits on a circuit board mounted on said base portion to receive signals from said first and second acoustic sensors and generate signals representative of said omni-directional response and said directional response; and
    a cable extending to said mine emulation system to feed said representative signals thereto for additional processing.

2. The apparatus of claim 1 wherein said higher frequency acoustic signals are in the range of 20 to 40 kHz.

3. The apparatus of claim 2 further comprising:
    an inclinometer mounted on said base portion of said housing to provide signals representing inclination of said housing by water currents.

4. The apparatus of claim 3 further comprising:
    an electrical power supply mounted on said base portion, said power supply being connected to said first and second acoustic sensors, said processing circuits, and said inclinometer.

5. The apparatus of claim 4 further comprising:
    an anechoic cone on said second acoustic sensor to assure said directional response.

6. The apparatus of claim 5 wherein said housing and components including said electrical power source, said inclinometer, said first acoustic sensor and said second acoustic sensors are collectively positively buoyant.

7. The apparatus of claim 6 wherein said cover and base portions are connected together by a plurality of bolts compressing an O-ring to assure said watertight buoyant housing.

8. The apparatus of claim 7 wherein said electrical power source and said inclinometer have mass to orient said first and second acoustic sensors upwardly facing from said cover portion.

9. The apparatus of claim 8 wherein said first acoustic sensor is in a cage to protect said first acoustic sensor, and said second acoustic sensor has rigid mounting structure, a tubular shroud, and said anechoic cone to protect said second acoustic sensor.

10. The apparatus of claim 9 further comprising:
    a plurality of lines connected to said positively buoyant housing to extend said positively buoyant housing and components upwardly in said ambient water from said mine emulation system during deployment therefrom.

11. The apparatus of claim 10 further comprising:
    a saddle structure mounted on the upper side of said mine emulation system to carry said positively buoyant housing and components to a deployment site and to release said housing and components therefrom.

12. The apparatus of claim 11 wherein said processing circuits include input buffers to receive said higher frequency acoustic signals from said first and second sensors, gain amplifiers to amplify the signal strengths of said higher frequency acoustic signals, narrow band-pass filters to replicate a response of a sensor of a mine and create RMS signals, RMS-to DC converters to convert the RMS signals to DC voltage levels, gain/buffer circuits to buffer-out the representative acoustic signals and to connect the buffered-out representative acoustic signals to processing modules said mine emulation system.

13. An acoustic float system to extend the frequency response of a mine emulator comprising:
    means for providing a watertight float housing having cover and base portions;
    means mounted to extend through said cover portion for responding omni-directionally to higher frequency acoustic signals transmitted through ambient water to provide first representative signals;
    means mounted on said housing and adjacent to said omni-directionally responding means for responding directionally to said higher frequency acoustic signals transmitted through said ambient water to provide second representative signals;

means mounted in said housing for processing said first and second representative signals to generate processed signals representative of simultaneous omni-directional response and directional response of said omni-directionally responding means and said directionally responding means, respectively; and means extending to a mine emulation system for feeding said generated processed signals to said mine emulation system for additional processing.

14. The acoustic float system of claim 13 wherein higher frequency acoustic signals are in the range of 20 to 40 kHz.

15. The acoustic float system of claim 14 further comprising:

means in said float housing means for providing signals representing inclination of said float housing means, said inclination signals being due to currents in said ambient water.

16. The acoustic float system of claim 15 further comprising:

means in said float housing means for supplying electrical power to said omni-directionally responding means, said directionally responding means, said inclination signal providing means, and said processing means.

17. The acoustic float system of claim 16 wherein said directionally responding means includes an anechoic cone to assure a directional response, and said float housing means, said omni-directionally responding means, said directionally responding means, said electrical supplying power means, said inclination signal providing means, and said processing means are collectively positively buoyant.

18. The acoustic float system of claim 17 wherein said float housing means is comprised of cover and base portions connected together by a plurality of bolts compressing an O-ring therebetween.

19. The acoustic float system of claim 18 wherein said supplying electrical power supplying means and said inclination signal providing means have mass to orient said omni-directionally responding means and said directionally responding means upwardly from said float housing means.

20. The acoustic float system of claim 19 wherein said float housing means has a plurality of lines connected to said float housing means to extend it and said omni-directionally responding means, said directionally responding means, said electrical supplying power means, said inclination signal providing means, and said processing means upwardly in said ambient water from said mine emulation system during deployment therefrom.

* * * * *